UNITED STATES PATENT OFFICE.

ALFRED FRANÇOIS MOSSELMAN, OF PARIS, FRANCE.

IMPROVEMENT IN THE MANUFACTURE OF MANURE.

Specification forming part of Letters Patent No. 44,147, dated September 6, 1864.

*To all whom it may concern:*

Be it known that I, ALFRED FRANÇOIS MOSSELMAN, of Paris, in the Empire of France, have invented a new and useful Improvement in the Manufacture of Manure; and I do hereby declare that the following is a full, clear, and exact description thereof, which will enable others skilled in the art to fully understand and use the same.

This invention relates to the manufacture of artificial manure out of lime and fecal or refuse animal matter; and the invention consists in producing what is termed "animalized lime" or "manure balls" by inclosing the fecal or refuse animal matter in a shell or envelope made of lime slaked with urine or other fertilizing-quid.

It consists, further, in a combination of urine with unslaked lime, the two being combined, either under pressure higher than that of the ordinary atmosphere or under ordinary atmospheric pressure, so that the lime is slaked by the action of the urine, and when pressure is applied the lime is caused to absorb a much larger quantity of the liquid than it does when combined with the same under the ordinary atmospheric pressure.

In order to manufacture the animalized lime, a quantity of unslaked lime is broken up in small lumps and mixed with about fifty per cent., by weight, of uirne or other fertilizing-liquid, which is poured over it with a watering-pot, so as to meet the same in small jets, or in the form of a shower. The lime is then left standing for about three days, to allow the same to become hydrated, and to cause a portion of the water in the urine to evaporate. By this operation the lime is formed in a powder, which, when cool, is ready to be mixed with the fecal matter. The fecal matter, which may be replaced by pasty fertilizing substances—such as fragments of fish, refuse of abattoirs, blood, &c.—is poured in a flat basin with a low rim and covered up with a thin stratum of lime-powder by means of a shovel or other suitable instrument. The shovel is then pushed down in the mass, and a suitable quantity of the same is raised and returned by dumping into the basin, and by these means the mass separates into lumps or balls, which are composed of a core of fecal matter surrounded by or enveloped in powdered lime. The process is repeated two or three times, and the mass is finally thrown on an inclined plane covered with lime, and in rolling down all the globes or balls become completely enveloped, and in this state they are ready to be put away for future use.

Instead of slaking the lime with urine or other fertilizing-liquid under the ordinary atmospheric pressure, this operation can be performed with advantage under a pressure of a column of urine of variable height. The lime, after it has been first reduced to powder by slaking with urine, as above stated, is placed in a closed vessel and again exposed to the action of urine under a pressure of twelve (more or less) inches of the liquid. By this process the capability of the lime to absorb the urine is considerably increased and the lime is supersaturated with urine. This supersaturated lime forms in itself a superior fertilizer, but, if desired, it can be mixed advantageously with fecal matter, as above specified.

I claim as new and desire to secure by Letters Patent—

1. The manufacture of animalized lime or manure balls by a process substantially as herein set forth.

2. The use of urine for the purpose of slaking lime, either under pressure or in the ordinary atmosphere, substantially as and for the purpose described.

A. F. MOSSELMAN.

Witnesses:
 DEMOS,
 E. SHERMAN GOULD.